United States Patent
Hasson

(10) Patent No.: US 9,799,067 B2
(45) Date of Patent: Oct. 24, 2017

(54) POINT OF SALE PAYMENT METHOD

(71) Applicant: Accenture Global Services Limited, Dublin (IE)

(72) Inventor: Robert Hasson, Antibes (FR)

(73) Assignee: Accenture Global Services Limited, Dublin (IE)

( * ) Notice: Subject to any disclaimer, the term of this patent is extended or adjusted under 35 U.S.C. 154(b) by 680 days.

(21) Appl. No.: 14/140,153

(22) Filed: Dec. 24, 2013

(65) Prior Publication Data

US 2014/0122216 A1  May 1, 2014

Related U.S. Application Data

(63) Continuation of application No. 12/368,387, filed on Feb. 10, 2009, now Pat. No. 8,645,274.

(30) Foreign Application Priority Data

Feb. 11, 2008 (EP) .................................... 08300081

(51) Int. Cl.
G06Q 20/00 (2012.01)
G06Q 30/00 (2012.01)
(Continued)

(52) U.S. Cl.
CPC ......... *G06Q 30/0633* (2013.01); *G06Q 20/20* (2013.01); *G06Q 20/202* (2013.01);
(Continued)

(58) Field of Classification Search
None
See application file for complete search history.

(56) References Cited

U.S. PATENT DOCUMENTS 5,991,739 A   11/1999   Cupps et al.
5,991,749 A   11/1999   Morrill
(Continued)

FOREIGN PATENT DOCUMENTS

WO   WO 0073955   12/2000
WO   WO 0111523   2/2001
(Continued)

OTHER PUBLICATIONS

Clarke and Wright, "Scheduling vehicles from a central depot to a number of delivery points," Operations Res., 12:568-581 (1964).
(Continued)

*Primary Examiner* — Robert R Niquette
*Assistant Examiner* — Joseph W King
(74) *Attorney, Agent, or Firm* — Fish & Richardson P.C.

(57) ABSTRACT

The present disclosure describes making a payment transaction between a customer and a merchant using a payment card of the customer including: transmitting details of the payment transaction from a mobile device to a remote server; capturing at least one image of the payment card using the mobile device of the merchant; transmitting the at least one image of the payment card to the remote server; identifying, by the remote server, the merchant and the payment card captured in the at least one image; and implementing the payment transaction between bank accounts of the customer and the merchant.

14 Claims, 3 Drawing Sheets

(51) Int. Cl.
*G06K 5/00* (2006.01)
*G06Q 30/06* (2012.01)
*G06Q 20/20* (2012.01)
*G06Q 20/32* (2012.01)
*G06Q 20/40* (2012.01)
*G07G 1/00* (2006.01)
*H04W 4/14* (2009.01)

(52) U.S. Cl.
CPC ............ *G06Q 20/32* (2013.01); *G06Q 20/322* (2013.01); *G06Q 20/3223* (2013.01); *G06Q 20/3255* (2013.01); *G06Q 20/3276* (2013.01); *G06Q 20/40* (2013.01); *G06Q 20/4012* (2013.01); *G07G 1/0081* (2013.01); *H04W 4/14* (2013.01)

(56) References Cited

U.S. PATENT DOCUMENTS

| | | |
|---|---|---|
| 6,195,691 B1 | 2/2001 | Brown |
| 6,401,085 B1 | 6/2002 | Gershman et al. |
| 6,519,571 B1 | 2/2003 | Guheen et al. |
| 6,526,449 B1 | 2/2003 | Philyaw et al. |
| 6,535,880 B1 | 3/2003 | Musgrove et al. |
| 6,546,374 B1 | 4/2003 | Esposito et al. |
| 6,587,838 B1 | 7/2003 | Esposito et al. |
| 6,697,824 B1 | 2/2004 | Bowman-Amuah |
| 6,726,094 B1 | 4/2004 | Rantze et al. |
| 6,801,228 B2 | 10/2004 | Kargman |
| 6,845,361 B1 | 1/2005 | Dowling |
| 6,901,397 B1 | 5/2005 | Moldenhauer et al. |
| 6,903,723 B1 | 6/2005 | Forest |
| 6,920,431 B2 | 7/2005 | Showghi et al. |
| 6,922,567 B1 | 7/2005 | Rydbeck |
| 6,959,283 B1 | 10/2005 | White |
| 6,961,778 B2 | 11/2005 | Swartz et al. |
| 6,980,962 B1 | 12/2005 | Arganbright et al. |
| 7,003,500 B1 | 2/2006 | Driessen |
| 7,069,235 B1 | 6/2006 | Postelnik et al. |
| 7,072,856 B1 | 7/2006 | Nachom |
| 7,110,964 B2 | 9/2006 | Tengler et al. |
| 7,124,098 B2 | 10/2006 | Hopson et al. |
| 7,124,101 B1 | 10/2006 | Mikurak |
| 7,197,478 B2 | 3/2007 | Kargman |
| 7,200,614 B2 | 4/2007 | Reid et al. |
| 7,206,756 B1 | 4/2007 | Walsky |
| 7,233,655 B2 | 6/2007 | Gailey et al. |
| 7,270,267 B2 | 9/2007 | Yeung et al. |
| 7,287,002 B1 | 10/2007 | Asher et al. |
| 7,302,429 B1 | 11/2007 | Wanker et al. |
| 8,645,274 B2 | 2/2014 | Hasson |
| 2002/0038261 A1 | 3/2002 | Kargman et al. |
| 2002/0042766 A1 | 4/2002 | Walker et al. |
| 2002/0046185 A1 | 4/2002 | Villart et al. |
| 2002/0049644 A1 | 4/2002 | Kargman |
| 2002/0067827 A1 | 6/2002 | Kargman |
| 2002/0128912 A1 | 9/2002 | Vindeby |
| 2002/0143634 A1 | 10/2002 | Kumar et al. |
| 2002/0156696 A1 | 10/2002 | Teicher |
| 2002/0188492 A1 | 12/2002 | Borton |
| 2003/0014327 A1 | 1/2003 | Skantze |
| 2004/0111321 A1 | 6/2004 | Kargman |
| 2004/0158494 A1 | 8/2004 | Suthar |
| 2004/0195314 A1 | 10/2004 | Lee |
| 2004/0215963 A1 | 10/2004 | Kaplan |
| 2004/0267616 A1 | 12/2004 | Kargman |
| 2005/0003839 A1 | 1/2005 | Tripp |
| 2005/0015256 A1 | 1/2005 | Kargman |
| 2005/0021407 A1 | 1/2005 | Kargman |
| 2005/0035208 A1 | 2/2005 | Elliot et al. |
| 2005/0045728 A1 | 3/2005 | Kargman |
| 2005/0049922 A1 | 3/2005 | Kargman |
| 2005/0108097 A1 | 5/2005 | McAleenan |
| 2005/0203854 A1 | 9/2005 | Das et al. |
| 2005/0209914 A1 | 9/2005 | Nguyen et al. |
| 2005/0220009 A1 | 10/2005 | Kargman |
| 2005/0222961 A1 | 10/2005 | Staib et al. |
| 2005/0267811 A1 | 12/2005 | Almblad |
| 2006/0010037 A1 | 1/2006 | Angert et al. |
| 2006/0041482 A1 | 2/2006 | Awiszus et al. |
| 2006/0080163 A1 | 4/2006 | Sutcliffe |
| 2006/0080165 A1 | 4/2006 | Sutcliffe |
| 2006/0122896 A1 | 6/2006 | Parsley |
| 2006/0123098 A1 | 6/2006 | Asher et al. |
| 2006/0129485 A1 | 6/2006 | Hamzy et al. |
| 2006/0155753 A1 | 7/2006 | Asher et al. |
| 2006/0155770 A1 | 7/2006 | Asher et al. |
| 2006/0173754 A1 | 8/2006 | Burton et al. |
| 2006/0178943 A1 | 8/2006 | Rollinson et al. |
| 2006/0178951 A1 | 8/2006 | Rund, III |
| 2006/0206390 A1 | 9/2006 | Asano |
| 2006/0218039 A1 | 9/2006 | Johnson |
| 2006/0258397 A1 | 11/2006 | Kaplan et al. |
| 2006/0293965 A1 | 12/2006 | Burton |
| 2006/0294025 A1 | 12/2006 | Mengerink |
| 2007/0061225 A1 | 3/2007 | Havas |
| 2007/0073586 A1 | 3/2007 | Dev et al. |
| 2007/0088624 A1 | 4/2007 | Vaughn et al. |
| 2007/0106565 A1 | 5/2007 | Coelho |
| 2007/0150321 A1 | 6/2007 | Zhao et al. |
| 2007/0150375 A1 | 6/2007 | Yang |
| 2007/0162849 A1 | 7/2007 | Marciano |
| 2007/0192206 A1 | 8/2007 | Manesh et al. |
| 2007/0208626 A1 | 9/2007 | Awiszus |
| 2007/0276651 A1 | 11/2007 | Bliss et al. |
| 2008/0048044 A1 | 2/2008 | Zhao et al. |
| 2008/0103918 A1 | 5/2008 | Burnettee et al. |
| 2008/0147514 A1 | 6/2008 | Shuster et al. |
| 2008/0167988 A1 | 7/2008 | Sun et al. |
| 2008/0208762 A1 | 8/2008 | Arthur et al. |
| 2008/0301585 A1 | 12/2008 | Murray et al. |
| 2009/0006181 A1 | 1/2009 | Ghosh et al. |
| 2009/0070228 A1 | 3/2009 | Ronen |
| 2009/0173784 A1* | 7/2009 | Yang ............... G06Q 20/042 235/380 |
| 2009/0182634 A1* | 7/2009 | Park ............... G06Q 20/20 705/14.36 |
| 2009/0234773 A1 | 9/2009 | Hasson |
| 2009/0240626 A1 | 9/2009 | Hasson et al. |
| 2009/0248538 A1 | 10/2009 | Taylor |
| 2010/0211491 A1 | 8/2010 | Kagan et al. |

FOREIGN PATENT DOCUMENTS

| | | |
|---|---|---|
| WO | WO 0173750 | 10/2001 |
| WO | WO03046784 | 6/2003 |
| WO | WO2004105359 | 12/2004 |
| WO | WO2005/001670 | 1/2005 |
| WO | WO2005001670 | 1/2005 |
| WO | WO2005036485 | 4/2005 |
| WO | WO2006095212 | 9/2006 |

OTHER PUBLICATIONS

Edwards et al., "A Methodology and Implementation for Analytic Modeling in Electronic Commerce Applications," Electronic Commerce Technologies, Lecture notes in computer science, 2040:148-157, 2001.

Medji, Chpt 5 "Network of Queues," Stochastic Models in Queuing Theory, Elsevier Academic Press, 2002, 35 pages.

Mingozzi et al., "Dynamic programming strategies and reduction techniques for the traveling salesman problem with time windows and precedence constraints," Operations Research, 45:365-377 (1997).

Munkres, "Algorithms for the Assignment and Transportation Problems," J Soc Indust Appl Math., 5(1):32-38 (Mar. 1957).

S. Kumar et al. "Mobile communications: evolution and impact on business operations" Technovation 23 (2003) 515-520.

Broadcom Analyst Meeting—Final, Fair Disclosure Wire, Waltham: Dec. 8, 2008.

(56) References Cited

OTHER PUBLICATIONS

"Real-Time Video Communications for GPRS", Simon N. Fabri et al., First International Conference on 3G Mobile Communications Technologies—conference publication No. 471, Mar. 27, 2000, pp. 426-430, London, UK.
European Search Report for EP Patent No. 08 30 0082 dated Jul. 31, 2008.
"Global Credit Authorization Guide v3.2", Aug. 11, 2006, http://www.nsosc.net/SECP/Exhibit1-AmericanExpressGlobalCreditAuthorizationGuide.pdf, 280 pages.
European Search Report for EP Patent No. 08 30 0081 dated Jul. 25, 2008.

* cited by examiner

POINT OF SALE PAYMENT METHOD

RELATED APPLICATION

This application is a continuation of U.S. patent application Ser. No. 12/368,387, filed Feb. 10, 2009, now U.S. Pat. No. 8,645,274, the disclosure of which is incorporated by reference herein in its entirety.

FIELD OF THE INVENTION

The present invention relates to a method and system for making payments, and in particular a method and system for making payments at a point of sale using a payment card.

BACKGROUND TO THE INVENTION

FIG. 1 illustrates schematically a payment method often used for making payments by payment card, such as a credit or debit card.

The payment card 102 is a smart card having a built-in chip 103, and is presented by a customer at a point of sale. The card is placed in a chip reader 104, which reads the chip and requests that the customer types his/her PIN (personal identification number). The correct PIN is stored on the electronic chip 103 and thus the chip reader 104 is able to immediately verify whether the PIN has been correctly entered. The card details and transaction details are then transmitted to a credit card clearing house (CCCH) 106, for example via a telephone line, and the credit card clearing house settles both the customer's account and the merchant's account, by transferring money from customer's bank 108 to the merchant's bank 110.

There are a number of drawbacks with the method represented by FIG. 1. Firstly, all businesses that wish to accept payments by smart card require a chip reader 104, which is costly, and not practical in many situations. Furthermore, the chip reader requires regular maintenance. There is thus a need for alternative means for verifying a customer's identity, and making electronic payments.

SUMMARY OF THE INVENTION

Embodiments of the present invention aim at at least partially addressing one or more of the needs in the prior art.

According to one aspect of the present invention, there is provided a method of making a payment transaction between a customer and a merchant using a payment card of the customer comprising: transmitting details of the payment transaction from a mobile device of the merchant to a remote server; capturing at least one image of the payment card using the mobile device; transmitting the at least one image of the payment card to the remote server; identifying, by the remote server, the merchant and the payment card captured in the at least one image; and implementing the payment transaction between bank accounts of the customer and the merchant.

According to an embodiment of the present invention, the method further comprises, prior to transmitting details of the payment transaction from the mobile device to the remote server, establishing a call between the mobile device and the remote server, the details being transmitted via the established call.

According to another embodiment of the present invention, the merchant is identified by the remote server by the caller identification number associated with the call.

According to yet another embodiment of the present invention, the call is a video call established via a mobile telephone network, and wherein said image of said payment card is captured by filming said payment card during said video call.

According to another embodiment of the present invention, the connection is a voice call, and wherein the server comprises an integrated voice response unit.

According to another embodiment of the present invention, the method comprises: after identifying the merchant and the payment card, receiving by the remote server a personal identification number from the customer; and comparing, by the remote server, the personal identification number with a pre-registered number associated with the payment card.

According to another embodiment of the present invention, the step of requesting a personal identification number from the customer comprises transmitting a PIN request from the remote server to the mobile device, and transmitting the PIN from the mobile device to the remote server.

According to another embodiment of the present invention, the step of requesting a personal identification number from the customer comprises transmitting a PIN request to a customer's mobile device.

According to another embodiment of the present invention, the payment card comprises a visual feature, and wherein the visual feature is captured in the at least one image.

According to another embodiment of the present invention, the method further comprises comparing, by the remote server, the visual feature in the captured image with a registered image in order to authenticate the payment card.

According to another embodiment of the present invention, the transaction details comprise at least a total amount of the payment transaction, and wherein the transaction details are typed using a keypad of the mobile device.

According to another embodiment of the present invention, the method further comprises, prior to the step of transmitting details of the payment transaction to the remote server, capturing by the mobile device at least one image to determine the payment details.

According to another embodiment of the present invention, identifying the payment card comprises using optical character recognition to recognize details printed on the card.

According to another aspect of the present invention, there is provided a system for making a payment comprising: a mobile device comprising a camera module arranged to capture at least one image of a payment card; and a remote server comprising a memory storing customer account details associated with an image relating to the payment card and merchant account details associated with details of the mobile device, the remote server arranged to identify the mobile device and to identify the payment card based on a comparison of at least part of the at least one captured image received from the mobile device and the image relating to the payment card, the remote server further being arranged to make the payment transaction between the customer's account and the merchant's account.

According to another embodiment of the present invention, the system further comprises a mobile device associated with the customer, wherein the remote server is further arranged to receive a personal identification number from the customer's mobile device and to compare the personal identification number with a number stored in the memory of the server associated with the payment card.

According to another aspect of the present invention, there is provided a remote server for making a payment transaction comprising: circuitry arranged to receive from a mobile device details of a payment transaction and at least one captured image of a payment card to be used in the payment transaction; a memory for storing a plurality of pre-registered images, and account details relating to a payment card associated with each image; and circuitry arranged to match a portion of the at least one captured image of the payment card in one of the pre-registered images, and to select the account details associated with the pre-registered image for use in making the payment transaction.

BRIEF DESCRIPTION OF TEE FIGURES

The foregoing and other purposes, features, aspects and advantages of the invention will become apparent from the following detailed description of embodiments, given by way of illustration and not limitation with reference to the accompanying drawings, in which.

DETAILED DESCRIPTION OF EMBODIMENTS OF THE PRESENT INVENTION

Figure 1:
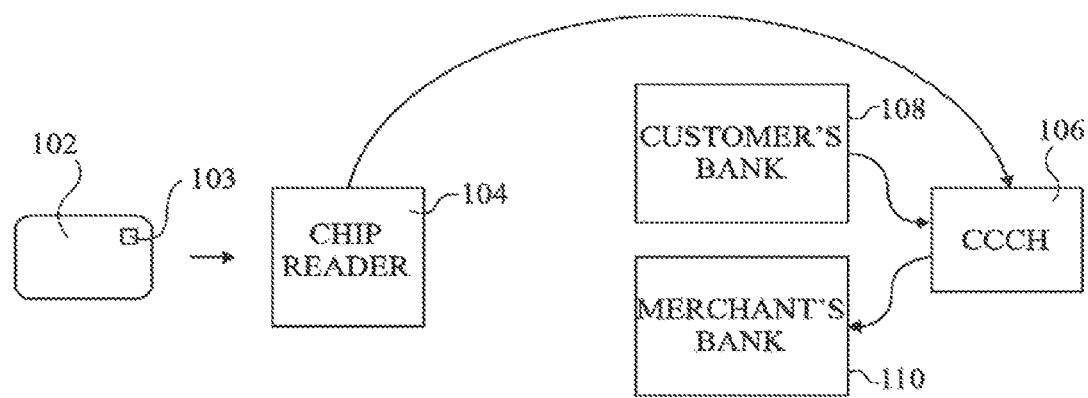
FIG. 1 (described above) illustrates schematically a payment method currently used for making payments using a payment card.
Figure 2:
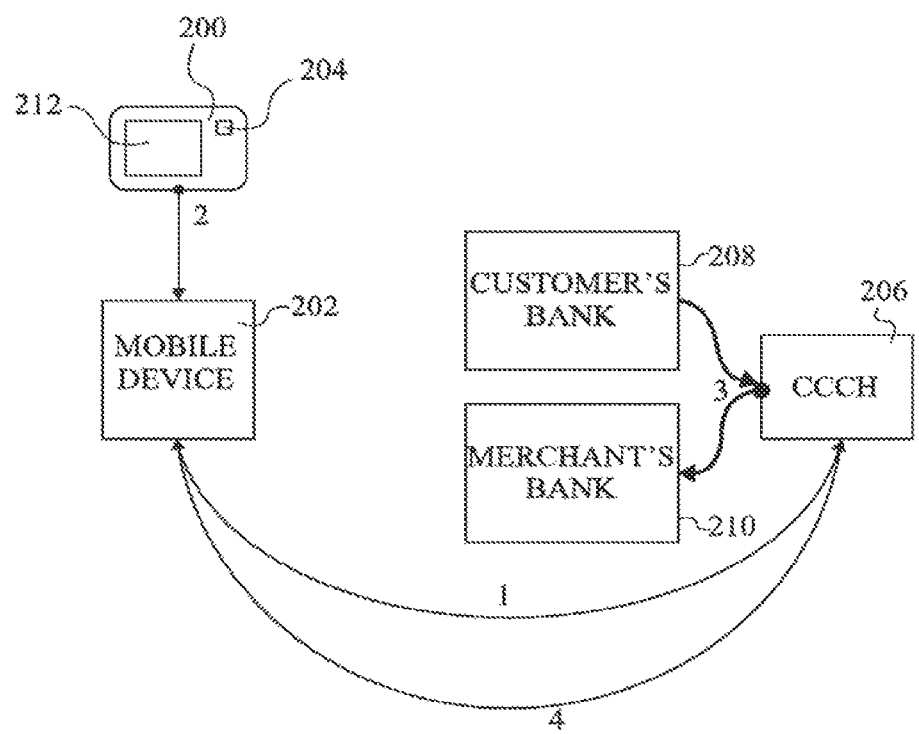
FIG. 2 illustrates schematically a payment method according to an embodiment of the present invention.

FIG. 2 illustrates schematically a method of payment using a payment card 200 and a mobile device 202.

The payment card 200 is any card allowing account details of a customer to be identified, and is for example a smart card comprising a chip 204, although in the method described herein, the payment card need not include electronic storage means.

Mobile device 202 for example belongs to the merchant, and comprises a camera (not shown in FIG. 2) that can capture images. In the present method, rather than using a chip reader to identify the customer and verify his/her PIN, mobile device 202 is used. Mobile device 202 is for example a mobile telephone, or other portable communications device comprising a camera and being capable of data, video and/or voice communication with a remote server.

Mobile device 202 is registered with a credit card clearing house (CCCH) 206. For example, the caller ID of the mobile device 202 is registered with the CCCH such that when a call or other data transmission is made using it, the calling/transmitting device is recognized, and thus the merchant is identified. Furthermore, the customer's payment card 200 is for example also registered with the CCCH 206, and preferably a PIN has been registered by the customer with the CCCH 206. The CCCH 206 executes the transaction between the customer's bank 208 and the merchant's bank 210, by directly requesting the transfers, for example after billing the customer.

The method starts at the point of sale, where a customer presents his or her payment card 200 to make a purchase. As shown by arrow 1 in FIG. 2, in a first step the merchant uses mobile device 202 to call the CCCH 206, which recognizes the merchant via the caller ID associated with the mobile device 202. The call is for example received by a server in the CCCH 206, which automatically responds to the call. In some embodiments the server in CCCH 206 operates an automatic voice response unit (AVRU). The call is for example a video call, or a standard voice call, made via a mobile telephone network (not shown).

Details of the transaction are then provided by the merchant. These could be typed into the keypad of the merchant's mobile device 202. In the case that an AVRU is used by the CCCH 206, the transaction details can be requested by a voice request in the AVRU, and a response typed by the merchant in the keypad of the mobile device 202, and recognised by the AVRU. Alternatively, the details could be spoken by the merchant and voice recognition used to determine the transaction details. The transaction details include at least the total transaction amount, and in some embodiments could include other details, such as the transaction date if the transaction is not to be executed immediately.

In alternative embodiments, rather than the merchant entering the transaction details, such as the total amount of the transaction, using the keypad or by voice, this data is captured automatically by the mobile device 202, for example using the camera of the mobile device. In particular, the device may comprise a barcode application adapted to decode barcodes. The merchant then uses the camera of the mobile device to capture images of barcodes attached to items that the customer wishes to purchase, and the barcodes are automatically decoded by the barcode application on the mobile device, to extract the price of the item, and optionally other details such as the name of the product. Once all of the barcodes have been captured and decoded, the total transaction amount is transmitted to the CCCH 206, for example by SMS text message. In this case; a call to the CCCH 206 is for example not needed. Additionally, not only barcodes of products could be scanned, but also the barcode of any offers, discounts or coupons, such that these can be taken into account.

Alternatively, in the case where a meter determines the transaction amount, for example a taxi meter in a taxi, or a parking payment machine displaying an amount to be paid, the merchant films or takes one or more images of the meter using the mobile device 202, and the transaction amount could then be automatically determined from the image, either by the mobile device 202, or by the CCCH 206, using image recognition.

The CCCH 206 then requests that the merchant provides an image of the payment card to be used in the transaction. For example, in some embodiments, a voice instruction is provided by the AVRU implemented by the server in CCCH 206 for the merchant to capture images of the payment card, or in the case of a video call, visual instruction could be transmitted to the display of the mobile device 202 by the server of CCCH 206. The merchant then captures one or more images of the payment card 200 using the camera of the mobile device 202. The captured images of the card are transmitted to the CCCH 206, for example either as part of the video call, or separately in the form of a media message. Other means of transmitting the image are possible.

The CCCH 206 recognizes the payment card 200 from the image, for example by recognizing the number stamped in the card, or by recognizing the branding of the card, or other features of the card. The payment card 200 for example also comprises a visual feature 212, distinguishing the payment card, which could be a type of barcode or the like. This can be used in some embodiments to recognise the card and also to check the authenticity of the payment card 200 The CCCH 206 then preferably prompts the customer to enter the pre-registered PIN, or a random part of it, for example using an AVRU, via the merchant's phone. The entered characters are transmitted to the CCCH 206 for verification. This PIN could be the same PIN that is stored on chip 204 of the payment card 200, but for security reasons, it could be a different number.

The CCCH 206 then verifies that the PIN has been correctly entered, and if so, settles both accounts, for example by billing the customer the transaction amount, and crediting the merchants bank with the corresponding amount. The CCCH 206 then for example sends an SMS (short message service) text message to the merchant's phone to confirm that transaction has been executed, meaning that the merchant can allow the customer to leave the store with the goods. If the customer's mobile telephone number has been registered with the CCCH, an SMS text message could also be sent to the customer's device to confirm the transaction, for example taking the place of a printed receipt.

Figure 3:
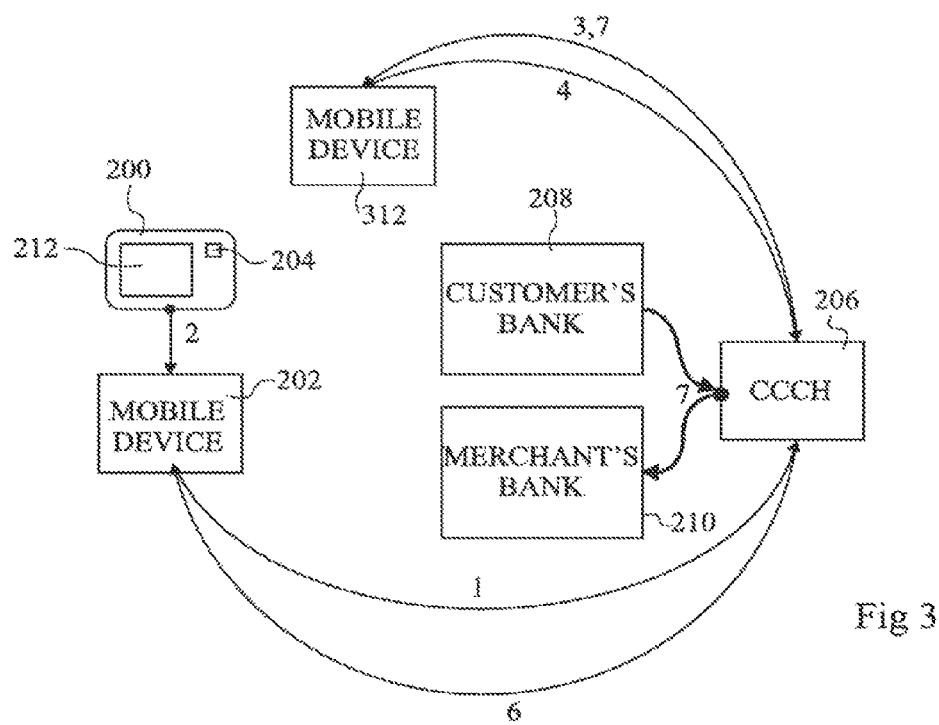
FIG. 3 illustrates schematically a payment method according to an alternative embodiment of the present invention.

FIG. 3 illustrates an alternative method of making a payment. Reference numerals 200 to 212 designate the corresponding features in FIG. 2, and will not be described again in detail.

The method of FIG. 3 involves an additional device, mobile device 312, which is a mobile device belonging to the customer. In this embodiment, the steps leading up to requesting the customer's PIN are the same as those described in relation to FIG. 2 and will not be described again in detail.

Once the merchant has indicated the transaction details, and the customer's payment card has been recognized, the CCCH 206 identifies the customer. In this embodiment, the details of customer's device have been pre-registered with the CCCH 206. The CCCH 206 determines that the customer's mobile telephone details are known, and that the customer has opted to have their PIN requested using their mobile device. In this case, rather than sending the PIN request to the merchant's mobile device 202, the CCCH 206 transmits a PIN request to the customer's mobile device 312, for example in the form of an SMS message, or by making a call using an AVRU implemented by a server in the CCCH 206. Alternatively, a SIM (subscriber identity module) toolkit application, a java application, phone resident application or the like, installed on the mobile device 202, could be triggered by a text message or other data bearing protocol from the CCCH 206 to present on the display of mobile device 202 a message requesting the customer's PIN. The customer receives the request, and responds by providing the PIN, for example by typing the characters on the keypad of mobile device 312, and transmitting these characters via SMS, or within the AVRU, the AVRU recognising the characters by their tone, or through the phone resident application on the mobile device 202.

Once the CCCH 206 has verified that the PIN is correct, a confirmation SMS can be transmitted to the customer's device 312, and to the merchant's device 202.

As described above, in both the methods of FIG. 2 and FIG. 3, the image of the customer's payment card 200 is captured using the camera of the merchant's mobile device, for example either during a video call, or as a separate image that can be transmitted, for example as a media message. In the case of a media message, in some embodiments, if the CCCH 206 determines that the captured image is not clear enough to be read, the CCCH could return a media message asking the merchant to try again. In the case that the image is captured during a video call, the return video provided to the merchant's mobile device by the CCCH 206 could indicate the identification status, such that when the card has been recognized a message appears on the merchant's phone 202 indicating this, and filming of the card is stopped.

Figure 4:
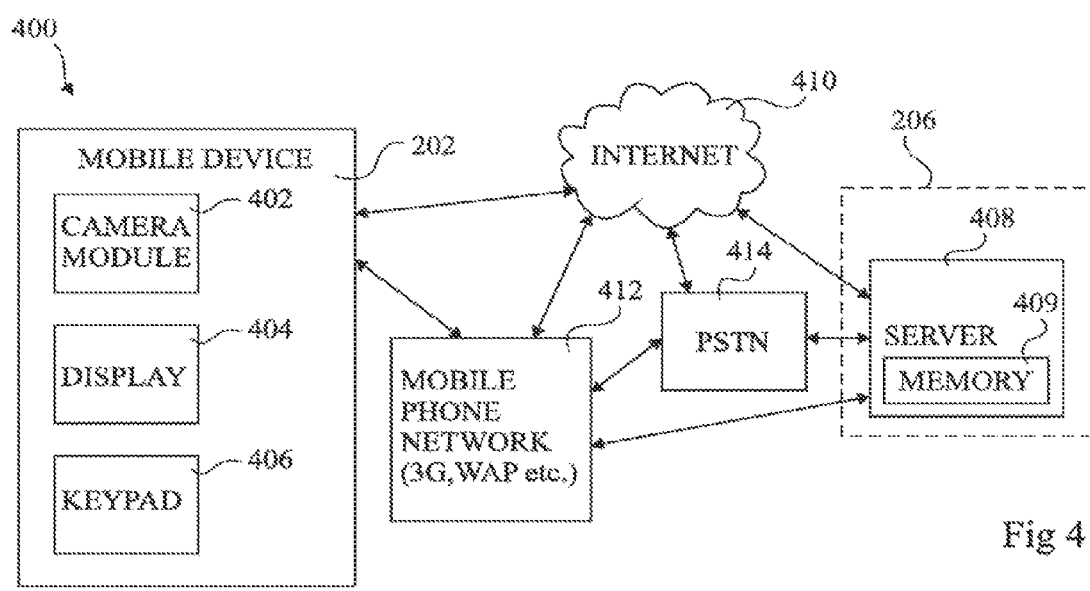
FIG. 4 illustrates schematically a payment system for implementing a payment method according to embodiments of the present invention.

FIG. 4 illustrates the blocks of a system 400 for implementing the method of FIG. 2 or FIG. 3. The mobile device 202 and CCCH 206 are illustrated in more detail, along with the interfaces through which they communicate.

The mobile device 202 comprises a camera module 402, a display 404 and a keypad 406. It may also comprise further components not shown in FIG. 4, for example a base band processor, memory and battery.

The CCCH 206 comprises a server 408 which is able to communicate with the mobile device 202. Server 408 is furthermore able to respond to voice and/or video calls and/or receive SMS text or media messages, and in some embodiments implements an AVRU for responding to call.

Server 408 comprises a memory 409 which stores a number of images associated with payment cards, and associated with each image, account details relating to the payment card are for example stored, along with a PIN associated with the payment card. In this way, when an image of the payment card captured by the merchant's mobile device is received by the server 408, the payment card can be identified by searching for a match among the registered images relating to payment cards, and in this way the customers account details can be determined. For example, the images stored in the memory 409 could include a distinctive region of the payment card, such as the visual feature 212, or an image of the card number stamped on the card, which can be recognised in the image captured by the mobile device using automatic object recognition implemented by the server 408. Furthermore, the memory may also store, associated with payment card details, an indication of whether a PIN request is to be made to a customer via their mobile device rather than the merchant's phone, and if so the customer's mobile telephone number is also stored.

As illustrated, in this example the interfaces between the mobile device 202 and the server 408 include the Internet 410, a mobile telephone network 412 and the public switched telephone network (PSTN) 414. In particular, the mobile device 202 may have WLAN (wireless local area network) access, allowing the merchant to access the Internet directly via a modem in the mobile device, and contact server 408 via an encrypted connection over the Internet 410. Alternatively, the mobile device 202 may be connected to the Internet 410 via the mobile telephone network 412, for example using 3G or WAP (wireless application protocol), and may connect to the server 408 via a secured encrypted connection via the mobile network 412 and the Internet 410. Alternatively, the server 408 may have a connection to the mobile network 412 directly, in which case the mobile telephone 202 could communicate to the server 408 directly via the mobile network 412, for example using 3G in the case of a 3G video call. As a further alternative, the server 408 may be accessed via the public switch telephone network (PSTN), illustrated by block 414, either via the mobile telephone network 412 or the Internet 410 accessible by the mobile device 202.

Figure 5:
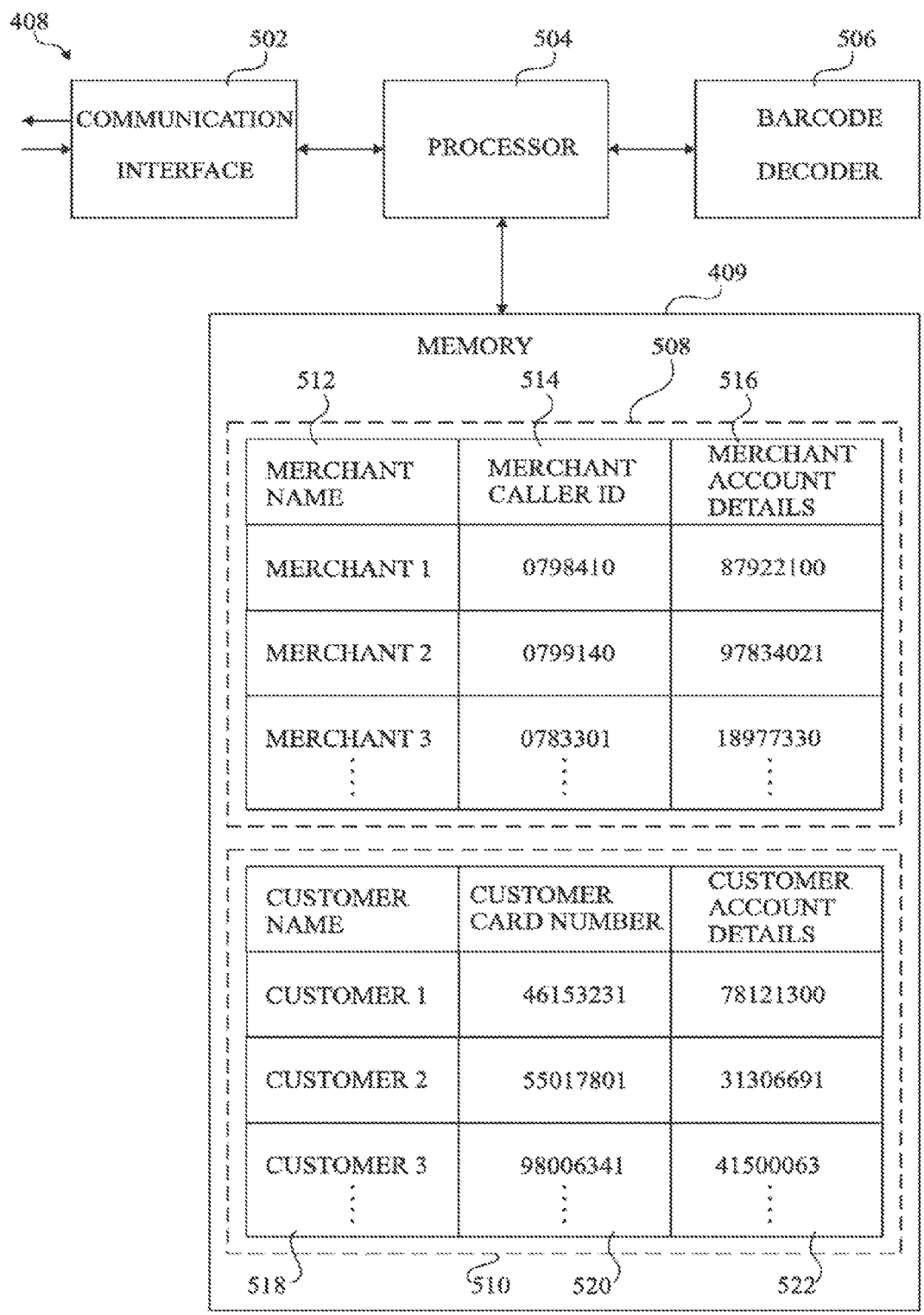
FIG. 5 illustrates the server of the system of FIG. 4 in more detail according to an embodiment of the present invention.

FIG. 5 illustrates the server 408 of FIG. 4 in more detail according to one embodiment.

As illustrated, a communication interface 502 is provided for communicating with the mobile device of the merchant. Communication interface 502 for example comprises circuitry for connecting the server 408 to one or more of the interfaces illustrated in FIG. 4 allowing communication with the mobile device.

The communication interface 502 is connected to a processor 504, which is in turn connected to an optional barcode decoder 506. The barcode decoder 506 is provided in embodiments in which the visual feature 212 is a 2-D barcode. The barcode decoder decodes the card details and any other data encoded by the barcode.

The memory 409 is connected to processor 504, and comprises a merchant database 508, and a customer database 520. In this example, the merchant database comprises merchant names 512, each associated with a merchant caller identifier 514, and merchant account details 516. The customer database comprises customer names 518, each associated with a customer card number 520, which is the payment card number of the customer's payment card, and customer account details 522.

The processor 504 executes the steps of the server described above in relation to FIGS. 2 and 3, for example providing an automotive voice response system, and accessing the memory 409 to extract account detail of the customer and merchant etc.

Thus, a method has been described wherein a mobile device is used by a merchant to make a customer payment transaction, using the camera of the mobile device to identify and in some embodiments authenticate the customer's payment card. The mobile device can then be used to make a secure connection to a credit card clearing house or the like in order to provide the transaction details, and preferably initiate a PIN request from the credit card clearing house.

An advantage of the payment method described herein is that, by using a mobile device having a digital camera and the facility to connect to a credit card clearing house via one of a number of possible connection means, the payment can be made in a cost effective and simple fashion. In particular, mobile devices are affordable devices that are already in high circulation, making them readily available for this purpose. In some embodiments, connection to the CCCH is via a video call, which has the additional advantage of allowing an image of the payment card to be captured with real time response from the CCCH. Mobile devices increasingly have 3G capability or the like, allowing video calls to be made.

In some embodiments, a PIN request is made to a customer's mobile device. This has the additional advantage of adding an extra level of security to the transaction. In particular, in the case that the payment card is stolen, the thief would also need the card owner's mobile device and PIN in order to make a fraudulent transaction.

Whilst a number of particular embodiments have been described, it would be clear to those skilled in the art that there are many alternatives that may be applied. For example, while the invention has been described in the case of a payment by credit card via a credit card clearing house, it will be apparent to those skilled in the art that the payment could relate to any type of card payment, in which a card can be identified to identify the customer's bank account. Furthermore, the credit card clearing house could be any establishment that can receive authenticate details of a transaction, and apply these by debiting the customer and crediting the merchant.

It will be clear that while the present invention has been described in relation to a purchase by a customer, the same method could also be applied to reimburse any customer, in which case the same acts could be performed, only the transaction details indicating that the money has to be credit to the customer's account, and debited from the merchant's bank.

Furthermore, while a few examples of connection interfaces between the merchant's mobile device and the CCCH have been provided, other interfaces could be used, for example other types of mobile telephony standards for calls or internet connections.

It will be apparent to those skilled in the art that the features described herein in relation to the various embodiments could be combined in alternative embodiments in any combination.

The invention claimed is:

1. A method performed by a first device, the method comprising:
   during a video communication between the first device and a second device that is remote from the first device, transmitting, by the first device to the second device, at least one image of a payment card being used in a payment transaction, the at least one image being recorded and transmitted in real time by way of the video communication only until a real time response is received by the first device indicating recognition, by the second device, of the payment card based on a correspondence between the at least one transmitted image and at least one pre-registered and stored image of the payment card that is accessed by the second device;
   transmitting, by the first device to the second device during the video communication with the second device, additional transaction information associated with the payment transaction;
   receiving, by the first device from the second device during the video communication and based on the recognition of the payment card and the transmitted additional transaction information, processing information associated with processing the payment transaction using the payment card; and
   providing, by the first device and for presentation, the received processing information associated with processing the payment transaction.

2. The method of claim 1, wherein transmitting the transaction information further includes transmitting a transaction amount to the second device.

3. The method of claim 1, further comprising:
   receiving, by the first device, an image relating to an item associated with the transaction;
   wherein transmitting the transaction information further includes transmitting the received image to the second device.

4. The method of claim 3, wherein the image relating to the item is a barcode associated with the item.

5. The method of claim 1, further comprising:
   establishing, by the first device, the video communication with the second device.

6. The method of claim 1, wherein the video communication is established via a mobile telephone network.

7. The method of claim 1, further comprising:
   receiving, by the first device, an image relating to an item associated with the transaction; and
   receiving, by the first device, an image of information associated with the item, the image of the information associated with the item being associated with at least one of:

an offer associated with the item;
a discount associated with the item; or
a coupon associated with the item;
wherein transmitting the transaction information further includes transmitting the received image of the item and the received image of the information associated with the item to the second device.

8. A first device comprising:
one or more processors; and
a memory communicatively coupled to the one or more processors, the memory storing instructions which, when executed by the one or more processors, cause the one or more processors to perform operations comprising:
   during a video communication between the first device and a second device that is remote from the first device, transmitting, by the first device to the second device, at least one image of a payment card being used in a payment transaction, the at least one image being recorded and transmitted in real time by way of the video communication only until a real time response is received by the first device indicating recognition, by the second device, of the payment card based on a correspondence between the at least one transmitted image and at least one pre-registered and stored image of the payment card that is accessed by the second device;
   transmitting, to the second device during the video communication with the second device, additional transaction information associated with the payment transaction;
   receiving, from the second device during the video communication and based on the recognition of the payment card and the transmitted additional transaction information, processing information associated with processing the payment transaction using the payment card; and
   providing, for presentation, the received processing information associated with processing the payment transaction.

9. The first device of claim 8, wherein transmitting the transaction information further includes transmitting a transaction amount to the second device.

10. The first device of claim 8, the operations further comprising:
   receiving an image relating to an item associated with the transaction;
   wherein transmitting the transaction information further includes transmitting the received image to the second device.

11. The first device of claim 10, wherein the image relating to the item is a barcode associated with the item.

12. The first device of claim 8, the operations further comprising:
   establishing the video communication with the second device.

13. The first device of claim 8, wherein the video communication is established via a mobile telephone network.

14. The first device of claim 8, the operations further comprising:
   receiving an image relating to an item associated with the transaction; and
   receiving an image of information associated with the item, the image of the information associated with the item being associated with at least one of:
      an offer associated with the item;
      a discount associated with the item; or
      a coupon associated with the item;
   wherein transmitting the transaction information further includes transmitting the received image of the item and the received image of the information associated with the item to the second device.

\* \* \* \* \*